United States Patent
MacKinnon et al.

(10) Patent No.: US 8,999,595 B2
(45) Date of Patent: Apr. 7, 2015

(54) FUEL CELLS HAVING IMPROVED DURABILITY

(75) Inventors: Sean M. MacKinnon, Fairport, NY (US); Frank Coms, Fairport, NY (US); Timothy J. Fuller, Pittsford, NY (US); Craig S. Gittleman, Rochester, NY (US); Ruichun Jiang, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 754 days.

(21) Appl. No.: 12/956,262

(22) Filed: Nov. 30, 2010

(65) Prior Publication Data

US 2012/0135332 A1 May 31, 2012

(51) Int. Cl.
| H01M 2/40 | (2006.01) |
| H01M 8/24 | (2006.01) |
| H01M 8/10 | (2006.01) |
| H01M 4/90 | (2006.01) |
| H01M 8/02 | (2006.01) |
| H01M 8/06 | (2006.01) |

(52) U.S. Cl.
CPC .......... *H01M 8/1051* (2013.01); *H01M 4/9041* (2013.01); *H01M 8/0271* (2013.01); *H01M 8/0289* (2013.01); *H01M 8/1004* (2013.01); *H01M 8/0637* (2013.01); *H01M 2008/1095* (2013.01); *Y02E 60/521* (2013.01)

(58) Field of Classification Search
USPC ........................................................ 429/492
See application file for complete search history.

(56) References Cited

U.S. PATENT DOCUMENTS

| 7,927,751 | B2 | 4/2011 | Gunji et al. | |
| 2005/0136308 | A1 | 6/2005 | Andrews et al. | |
| 2005/0170233 | A1* | 8/2005 | Beatty et al. | 429/35 |
| 2007/0141442 | A1* | 6/2007 | Schlerf | 429/38 |
| 2007/0178334 | A1* | 8/2007 | Gunji et al. | 429/12 |
| 2008/0166617 | A1* | 7/2008 | Shizuku et al. | 429/30 |
| 2009/0117433 | A1* | 5/2009 | Yamamoto et al. | 429/30 |

FOREIGN PATENT DOCUMENTS

| CN | 101507032 A | 8/2009 |
| JP | 2008218100 A | 9/2008 |

OTHER PUBLICATIONS

Chinese Office Action dated Sep. 11, 2014; Application No. 201110461885.1; Applicant: GM Global Technology Operations LLC.; 10 pages.

\* cited by examiner

*Primary Examiner* — Ula C. Ruddock
*Assistant Examiner* — Jacob Marks
(74) *Attorney, Agent, or Firm* — BrooksGroup

(57) ABSTRACT

A fuel cell or a fuel cell stack component comprises an active area and a non-active area. A peroxide decomposing metal compound or metal alloy is disposed in or on the non-active area of a fuel cell or a fuel cell component. The metal compound or alloy is capable of providing a peroxide decomposing metal species that can migrate from the non-active area to an active area of a fuel cell. A fuel cell or membrane electrode assembly having a peroxide decomposing metal compound or alloy disposed in its non-active area exhibits improved durability.

10 Claims, 3 Drawing Sheets

FUEL CELLS HAVING IMPROVED DURABILITY

TECHNICAL FIELD

The field to which the disclosure generally relates includes fuel cell, membrane electrode assembly and process of improving fuel cell durability.

BACKGROUND

Durability is one of the key factors that determine the commercial viability of a fuel cell. A vehicle fuel cell, for example, needs to last at least 5,000 hours. Such a high durability requirement challenges the materials under consideration for a fuel cell. Particularly, the ion conductive membrane is known to degrade due to reaction with reactive species such as radicals formed as a side product during normal fuel cell operation. To remediate this problem and extend the life of the ion conductive membrane, additives and coatings have been proposed to treat the membrane. The additives and coatings, however, may interfere with the electrochemical processes in a fuel cell and thus compromise the performance of the ion conductive membrane in addition to adding cost. Many of the additives can adversely affect the activity of the critical catalyst used in a fuel cell. There is thus a need to improve fuel cell durability without affecting the normal electrochemical process or performance at a minimal cost.

SUMMARY OF EXEMPLARY EMBODIMENTS

One embodiment of the invention includes a fuel cell comprising a polymer electrolyte membrane having an active area and a non-active area. A peroxide decomposing metal compound or metal alloy is disposed in at least part of the non-active area. The peroxide decomposing metal compound or alloy may be disposed in the non-active area of a membrane electrode assembly and/or a fuel cell gasket area.

Another embodiment of the invention includes a method of producing a fuel cell comprising fuel cell stack components including at least a cathode, an anode, a gas diffusion media, a bipolar plate and an ion conductive membrane, each having an active and a non-active area; disposing a metal compound, metal alloy or metal oxide in the non-active area of at least one of the stack components to decompose hydrogen peroxide and/or hydrogen peroxide decompositions products.

The metal compounds, metal alloys or metal oxides can produce a peroxide or radical decomposing metal species, such as a metal ion or metal ion complex, that are capable of migrating from a non-active area to an active area during normal fuel cell operation.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

A fuel cell may be constructed by stacking a series of fuel cell stack components such as membrane electrode assemblies (MEA), gas diffusion media (GDM), bipolar plates, gaskets, and water cooling/management plates. The fuel cell stack components may be stacked face-to-face in a particular order to form serially linked individual electrochemical cells. A fuel cell component may include an active area and a non-active area. An active area is referred to herein as the functional area where a physical, chemical and/or electrochemical process takes place in the fuel cell or fuel cell components. One example of active area in a membrane electrode assembly is the middle area that is accessible to reactant gases for electrochemical reaction. The active area of a gas diffusion medium, for another example, is the area physically accessible to a reactant gas. The active area of a gas diffusion medium allows the reactant gas to diffuse or pass through. In contrast, a non-active area, is referred to as the non-functional area in a fuel cell component or a fuel cell. Typically, there is no active chemical, physical or electrochemical activities or processes within the non-active area that contribute directly to the fundamental fuel cell function. The non-active area is usually located on the peripheral section of a fuel cell component and the peripheral section of a fuel cell. The peripheral areas of a MEA, a gas diffusion medium, and a bipolar plate that overlap with a fuel cell gasket (referred to herein as gasket area) are examples of non-active areas. The non-active areas in a fuel cell are typically not accessible to a reactant gas. There are no fundamental or active chemical, electrochemical or physical fuel cell activities in the non-active areas.

Figure 1:
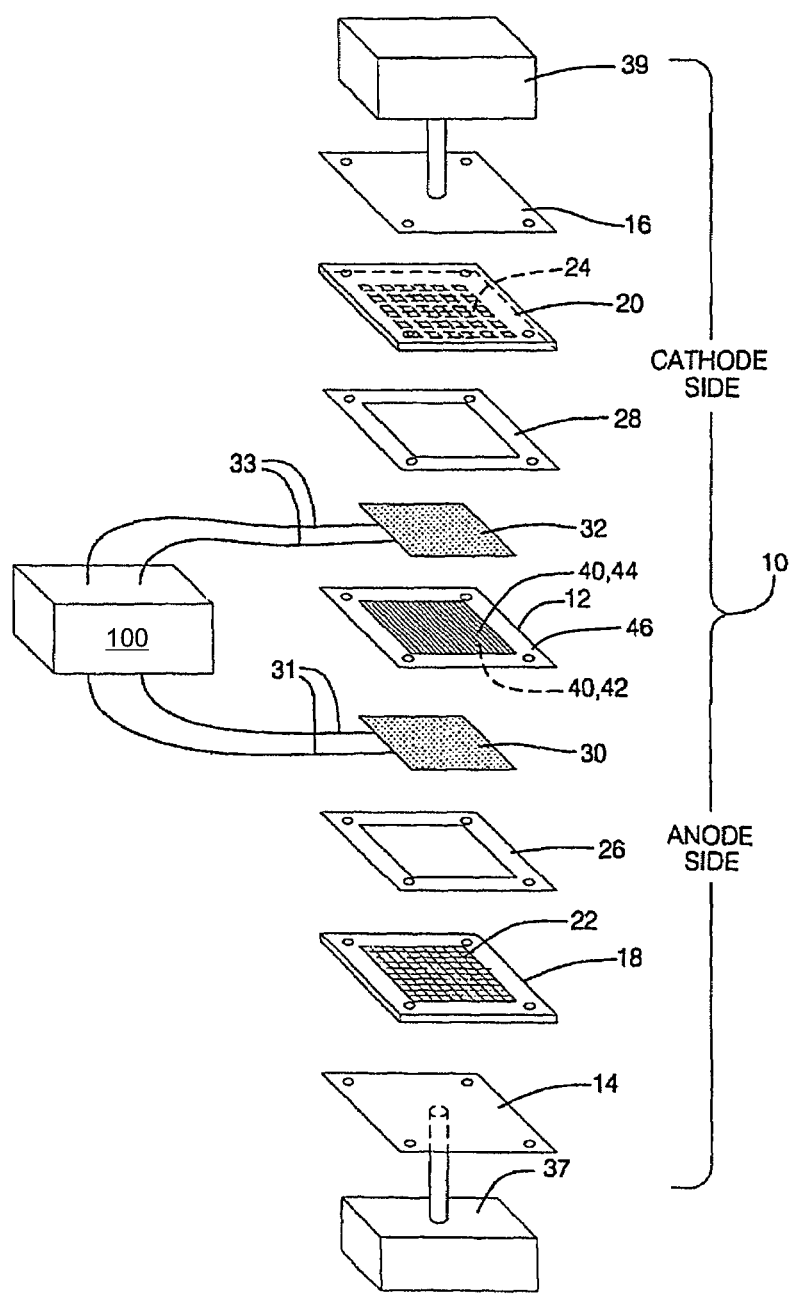
FIG. 1 is a schematic view of an unassembled fuel cell stack.

Referring to FIG. 1, an electrochemical cell 10 with a membrane electrode assembly (MEA) 12 incorporated therein along with other fuel cell stack components is shown in pictorial unassembled form. The MEA 12 comprises an ion conductive electrolyte membrane sandwiched between a catalyst 40 loaded anode 42 and a catalyst 40 loaded cathode 44. There is only one electrochemical cell 10 shown in this fuel cell construction. However, a fuel cell may be constructed by including multiple electrochemical cells stacked in a serial manner for higher total energy output.

The fuel cell shown in FIG. 1 comprises stainless steel endplates 14, 16, bipolar plates 18, 20 with gas flow channels 22, 24 to facilitate gas distribution, gaskets 26, 28, gas diffusion media (typically made of carbon cloth) 30, 32 with respective electrical connections 31, 33 and the membrane electrode assembly 12. Anode connection 31 and cathode connection 33 are used to interconnect with an external circuit 100, which may include other fuel cells. The fuel cell includes reactant gases, one of which is a fuel supplied from fuel source 37, and another of which is an oxidizer gas supplied from an oxidizer gas source 39. The fuel may be hydrogen gas and the oxidizer gas source may be air or oxygen. The gases from sources 37, 39 diffuse along respective bipolar plates 18, 20 and through gas diffusion media 30, 32 to opposite sides of the MEA 12 for electrochemical reactions and generation of electricity. As shown in FIG. 1, the areas on MEA 12 covered with the catalyst 40 loaded anode 42 and cathode 44 are active areas where the reactant gas undergoes electrochemical reactions to produce electricity. The peripheral area 46 not covered with catalyst loaded electrodes is a non-active area. Additionally, the areas of the gaskets 26, 28 and areas that overlap with the gaskets 26, 28 on other fuel cell components are also non-active areas.

It has been known that hydrogen peroxide is formed on at least one of the electrodes 42, 44 and migrates into the ion conductive membrane. It is believed that chemical degradation is mediated by hydroxyl radical, .OH, an extremely reactive and short-lived species. Hydroxyl radical can be directly formed at either electrode or it can be produced indirectly from hydrogen peroxide via metal ion (i.e. $Fe^{2+}$) catalyzed decomposition. Hydrogen peroxide, like hydroxyl radical, can be formed at either electrode. The combination of hydroxyl radical and hydrogen peroxide is quite effective at damaging the ion conductive membrane, leading to a loss of fuel cell durability. The key to mitigating chemical degradation, then, is to decompose both hydroxyl radical and hydrogen peroxide before the ion conductive membrane is damaged.

Peroxide decomposing metal compounds and alloys are included in the fuel cell to reduce the concentration of harmful hydrogen peroxide and its radicals. The peroxide decomposing metal compounds and alloys are not disposed directly in the active areas of the fuel cell or fuel cell stack components. Instead, they are disposed initially in the non-active area of the fuel cell or a fuel cell component. In one embodiment, the metal compound or alloy is capable of providing a peroxide decomposing metal species, such as a metal ion and a metal ion complex, which migrates from the non-active area to an active area during fuel cell operation. Since most of the metal compounds or alloys are located in the non-active area and very small amount of metal species are allowed to migrate into the active area, peroxides formed during a fuel cell operation can be effectively reduced by the metal species without adversely affecting the normal electrochemical processes of the fuel cell. The peroxide decomposing metal compounds or alloys may be disposed in the non-active areas (such as area 46 in FIG. 1) of a MEA 12 on either or both sides. The peroxide decomposing metal compounds or alloys may be disposed on or in a fuel cell gasket such as gaskets 26, 28.

An ionomer may be included together with the metal compound or alloys to facilitate the migration of metal species from a non-active area to an active area. An ionomer is referred to herein as a polymeric or oligomeric electrolyte. Examples of ionomers may include, but not limited to, sulfonated perfluoropolymers such as NAFION®, a family of polyelectrolyte products marketed by DuPont, sulfonated polystyrene, carboxylic acids and phosphonic acid based ionomers. The ionomer may be mixed with a peroxide decomposing metal compound or alloy before being applied to a non-active area of a fuel cell or fuel cell component. The ionomer may also be applied separately to the non-active area.

The metal compound or alloy may comprise at least one element or at least one compound from the group consisting of metallic transition elements of the Periodic Table of the Elements, i.e. from groups IIIb, IVb, Vb, VIb, VIIb, VIIIb, Ib IIb, the lanthanide series, or at one least metallic element or at least one compound from main group 4 (IVa) of the Periodic Table of the Elements. The metal compound may comprise a metal salt, metal oxide, metal alloy metal complex or organometallic compound of at least one metal element selected from the group consisting of Mn, Al, Mg, Zn, Co, V, Ru, Pd, Mo, Sn, Ce, and W. The metal compound may comprise a salt of $Mn^{2+}$, $Mn^{3+}$, $Mn^{4+}$, $Al^{3+}$ $Ce^{3+}$, $Ce^{4+}$, $Mg^{2+}$ and $Zn^{2+}$ The metal salt may include, but not limited to, metal salts of sulfate, sulfonate, carbonate, chloride, nitrate, phosphate, carboxylate, borate, silicate, hexafluoroborate, and perchlorate. The metal compound may include organometallic complexes such as metal phthalocyanines, prophyrins and metal EDTA (ethylenediaminetetraacetic acid) complexes. Examples of metal prophyrin complexes may include zinc prophyrin, and cobalt prophyrins. Metal EDTA complexes may include EDTA complexes of $Ce^{3+}$, $Ce^{4+}$, $Mn^{2+}$, $Mn^{3+}$, $Mn^{4+}$, and $Zn^{2+}$. The metal compound may also include metal oxides and hydroxides of Mn, Al, Mg, Zn, Co, V, Ru, Pd, Mo, Sn, Ce, W, Pt, Ir, Os, Ag, such as $Ce_2O_3$, $CeO_2$, $MnO_2$, $RuO_2$, ZnO, $WO_3$, MgO, CaO, BaO, $ZrO_2$, $TiO_2$, $MnO_2$, $Al_2O_3$, $RuO_2$, $WO_3$, and $MoO_3$. Examples of metal alloys include, but not limited to, alloys containing at least one of, Mn and Ce elements.

Under fuel cell operating conditions, the metal compounds and alloys described above can provide a metal species, such as a metal ion and a metal ion complex, that is capable of migrating from the non-active area to an active area, particularly, to the active area of the MEA 12. For example, cerium (III) carbonate or cerium(III) nitrate disposed in the non-active area of a gasket region, can provide cerium(III) ions which are capable of migrating from the non-active area to the active area of a membrane electrode assembly. Similarly, an EDTA complex of cerium(III) disposed in a non-active area of a gasket, can migrate to an active area of the MEA 12. Cerium ions and their complexes are effective in decomposing hydrogen peroxides in the active area of the MEA 12. The metal compounds or alloys in the non-active area thus provide a small and effective amount of metal species to the active area of a fuel cell for extended periods of time.

The peroxide decomposing metal compound or alloy may be disposed on the non-active area of a fuel cell or a fuel cell stack component by a coating or a deposition process. Coating process may include spray coating, extrusion coating, solution casting, roll coating and the like. The metal compounds or alloys may also be disposed on the non-active area through CVD (chemical vapor deposition), PVD (physical vapor deposition method), vacuum deposition, sputtering, atomic layer deposition (ALD) and other deposition methods known to an ordinary skill in the art. In one example, a peroxide decomposing metal compound or alloy may be coated or deposited on a fuel cell gasket such as gaskets 26, 28 using one of the processes mentioned above. In another example, a peroxide decomposing metal compound or alloy may be coated or deposited on the non-active area of the MEA 12 using one of the processes mentioned above.

In one embodiment, a metal compound or alloy may be incorporated into a gasket material. The metal compound or alloy may be mixed with a plastic or rubber resin before forming into a fuel cell gasket. Examples of plastic and rubber resins may include, but not limited to polytetrafluoroethylene, polyvinylidene fluoride, poly(ethylene naphthalate), poly(styrene-butadiene) silicone rubber, EPDM (ethylene propylene diene monomer rubber), and fluoroelastomers. A plastic film or a rubber sheet, for example, may be cast using the corresponding resin having a peroxide decomposing metal compound or alloy mixed in. A gasket is then produced by die-cutting the plastic film or rubber sheet.

In another embodiment, the gasket material is made of an ionomer resin which has been ion-exchanged to contain a metal ion. The demonstrated example was a PFSA membrane (50 micron) that was ion exchanged in $Ce^{3+}$, followed by die-cutting and placement in the overlap region of the non-active area. The test protocol (relative humidity (RH) cycle with electrical load—a simulated chemical and mechanical stress test) is provided along with a graph of the extended durability of the inventive example (>5000 cycles vs. baseline of 1200 cycles to failure). Further investigation has shown that the $Ce^{3+}$ has migrated from the periphery of the cell into the middle of the active area. Alternatively, an adhesive layer may be coated on the "MEA side" of the gasket which will contact the MEA 12 in the inactive area. The adhesive would be ionomeric (sulfonic acid, carboxylic acid or phosphonic acid) or have a suitable amount of material at the interface facilitating ion exchange and migration.

To facilitate and control the migration of metal species from the metal compounds or alloys, the fuel cell may be operated at a certain range of temperatures and humidity. The presence of sufficient moisture in the reactant gas stream, in particular, may promote and control the migration of metal species. A relative humidity of about 10% to 99%, or from about 40% to about 80% in the reactant gas stream may be used. The operating temperature of the fuel cell may be in the range of 50° C. to 120° C.

Experimental Gasket Preparation

Nafion NRE211 membrane was cut into 13×13 cm square patches (4 in total) and soaked for 72 hours in 800 ml of de-ionized water containing 13.9 grams of cerium (III) nitrate hexahydrate, 99.999% purity corresponding to a 10-fold molar excess of $Ce^{3+}$ ions based on the total number of sulfonic acid groups in the membranes. The membranes were assumed to be fully exchanged.

The 13 cm×13 cm membranes were then die cut as anode and cathode gaskets for 50 $cm^2$ fuel cell testing. Typically, the gaskets were cut to have either 38 $cm^2$ or 44 $cm^2$ active area windows for the electrodes resulting in gasket areas of 62 $cm^2$ and 56 $cm^2$, respectively.

Cell Build

An MEA was prepared in order to test the effectiveness of $Ce^{3+}$ migration into the active area in an effort to mitigate the chemical degradation of perfluorosulfonic acid (PFSA) membranes. A baseline MEA (07-0257) was constructed using a NRE211 membrane, without exchanged $Ce^{3+}$ ions, as the anode and cathode sub-gaskets die cut to 38 $cm^2$ and 44 $cm^2$ active areas, respectively. The comparative example (07-0391) was prepared in the same architecture as the baseline using the same lot of NRE211 membrane that was previously exchanged with a 10-fold molar excess of $Ce^{3+}$, as shown in FIG. 1. Two 6 mil Teflon gaskets were used in both cases compared to the standard 7 mil Teflon gaskets for the series of diffusion media. The electrodes employed were of the catalyst coated diffusion media (CCDM) type wherein the catalyst ink is applied to a porous, electrically conductive, carbon fiber layer. The details of the cell build were as follows:

TABLE 1

Description of Cell Builds

| Build Number | Description |
|---|---|
| 07-0257 (baseline) | N111 membrane, 25 µm<br>CCDM w/SGL25BC<br>NRE211 Anode SG, 38 $cm^2$, 25 µm<br>NRE211 Cathode SG, 44 $cm^2$, 25 µm |
| 07-0391 | N111 membrane, 25 µm<br>CCDM w/SGL25BC<br>Ce_NRE211 Anode SG, 38 $cm^2$, 25 µm<br>Ce_NRE211 Cathode SG, 44 $cm^2$, 25 µm |

Testing Protocol

RH Cycle at 0.1 $A/cm^2$—Constant Current

Cell Build: 50 $cm^2$ cell with 2 mm lands & 2 mm straight channel flow field

Cycle: 2 min 150% RH $H_2$/air; 2 min 0% RH $H_2$/air flow

Conditions: 80° C., 0 kPag, 20 SLPM anode and cathode stoichiometries, counter-flow Diagnostics: Physical crossover leak (failure=10 sccm), $H_2$ crossover current ($mA/cm^2$), fluoride ion release rate from membrane degradation (FRR) ($g/cm^2 \cdot h$)

Figure 2:
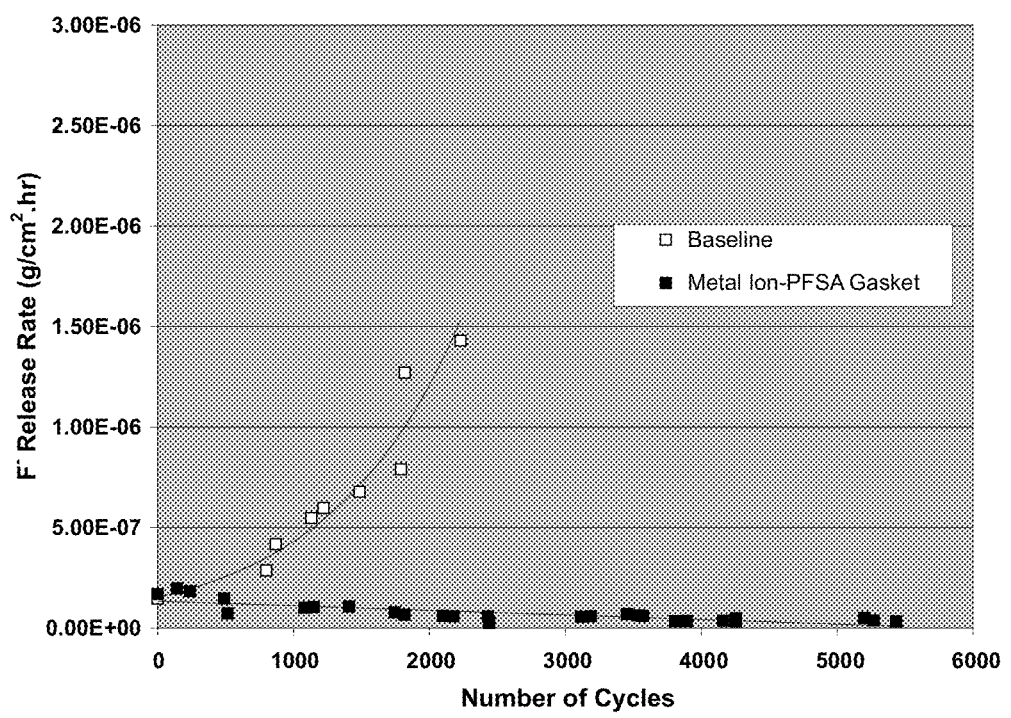
FIG. 2 is a graph showing fluoride release rate for an exemplary embodiment compared to a baseline sample.

FIG. 2 shows the fluoride release rate over the duration of the accelerated durability test protocol as outlined above. The baseline comparative example demonstrates increasing release rate of fluoride anions in the product water of the fuel cell due to degradation of a perfluorosulfonic acid based proton exchange membrane. Comparatively, the incorporation of metal ions into a gasket prepared from an ion-exchanged solid polymer electrolyte, provides a chemically stabilized membrane as the fluoride release rate does not increase beyond $10^{-8}$ $g/cm^2 \cdot hr$ over 5000 cycles. Baseline refers to the control membrane sample without the additive in the inactive area.

Figure 3:
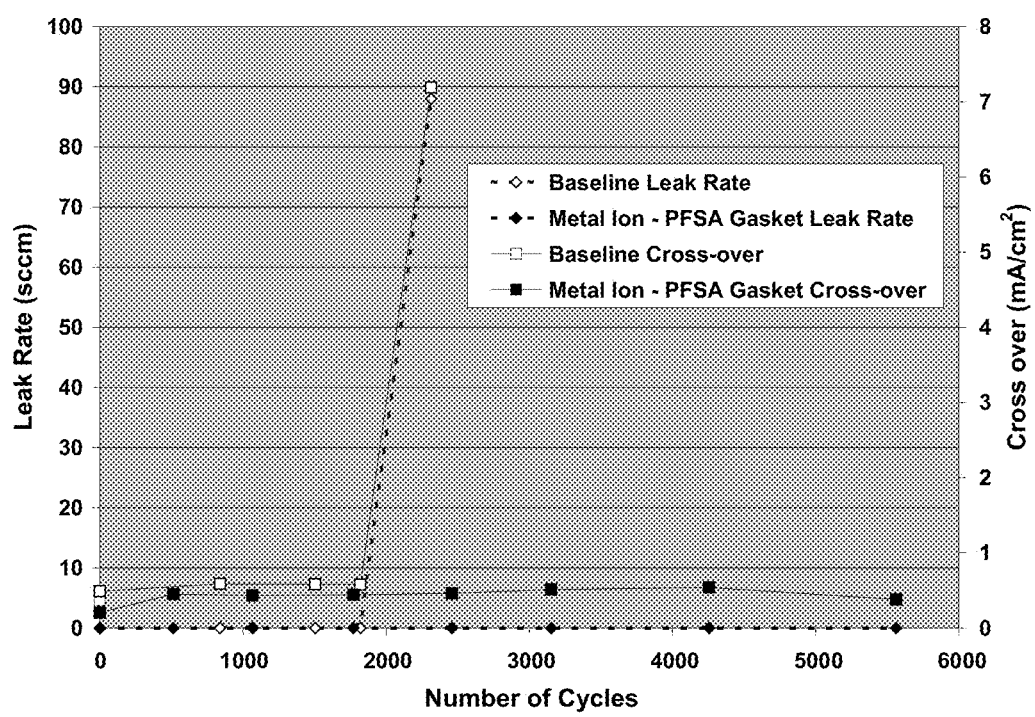
FIG. 3 is a graph or the corresponding leak rate for the same accelerated durability protocol used to obtain data for FIG. 2.

FIG. 3 is a graph that discloses the corresponding leak rate for the same accelerated durability protocol. As the test continues past 2000 cycles, the baseline develops a 90 sccm leak rate, corresponding to a $H_2$ gas crossover value of 7 $mA/cm^2$ at the end of test. Under the same protocol, the metal ion—PFSA gasket shows no measureable leak rate and a constant $H_2$ gas crossover value of approximately 0.5 $mA/cm^2$, unchanged from beginning of the test.

The above description of embodiments of the invention is merely exemplary in nature and, thus, variations thereof are not to be regarded as a departure from the spirit and scope of the invention.

What is claimed is:

1. A method of producing a fuel cell comprising:
providing fuel cell stack components including at least a cathode, an anode, a gas diffusion media, a bipolar plate and an ion conductive membrane, each having an active and non-active areas;
disposing a peroxide decomposing metal compound or metal alloy in said non-active area of at least one of said stack components and wherein the metal compound comprises an organometallic compound comprising at least one of a metal EDTA compound, a metal phthalocyanine, or a metal prophyrin.

2. A method of producing a fuel cell as set forth in claim 1 further comprising operating said fuel cell with reactant gases stream having a relative humidity of 10 to about 99%, causing migration of a peroxide decomposing metal ion or metal ion complex from said metal compound or metal alloy to an active area of the fuel cell.

3. A membrane electrode assembly comprising a peroxide decomposition metal compound disposed in the non-active area of the membrane electrode assembly and wherein the metal compound comprises an organometallic compound comprising at least one of a metal EDTA compound, a metal phthalocyanine, or a metal prophyrin.

4. A membrane electrode assembly as set forth in claim 3, wherein said peroxide decomposition metal compound comprises an organometallic compound Ce.

5. A fuel cell gasket comprising a peroxide decomposing metal compound or alloy and wherein the metal compound comprises an organometallic compound comprising at least one of a metal EDTA compound, a metal phthalocyanine, or a metal prophyrin.

6. A fuel cell gasket as set forth in claim 5, wherein said metal compound comprises an organometallic compound Ce.

7. A fuel cell gasket as set forth in claim 5, wherein said metal compound is capable of providing a peroxide decomposing metal ion or metal ion complex that migrates to an active area of a fuel cell under a normal fuel cell operation.

8. A fuel cell gasket as set forth in claim 5, wherein said metal compound or alloy is disposed on or in a plastic or rubber gasket material.

9. A membrane electrode assembly as set forth in claim 3, wherein said peroxide decomposition metal compound comprises an organometallic compound comprising at least one of a metal EDTA compound, a metal phthalocyanine, or a metal prophyrin, wherein the metals comprise of at least one of Mn, Al, Mg, Zn, Co, V, Ru, Pd, Mo, Sn, Ce, W, Pt, Ir, Os or Ag elements.

10. A fuel cell gasket as set forth in claim 5, wherein said metal compound comprises an organometallic compound comprising at least one of a metal EDTA compound, a metal phthalocyanine, or a metal prophyrin, wherein the metals comprise of at least one of Mn, Al, Mg, Zn, Co, V, Ru, Pd, Mo, Sn, Ce, or W elements.

\* \* \* \* \*